July 22, 1947.  K. WILCOXON  2,424,346
STRIPPING CASINGS FROM SAUSAGES
Filed April 5, 1940  6 Sheets-Sheet 3

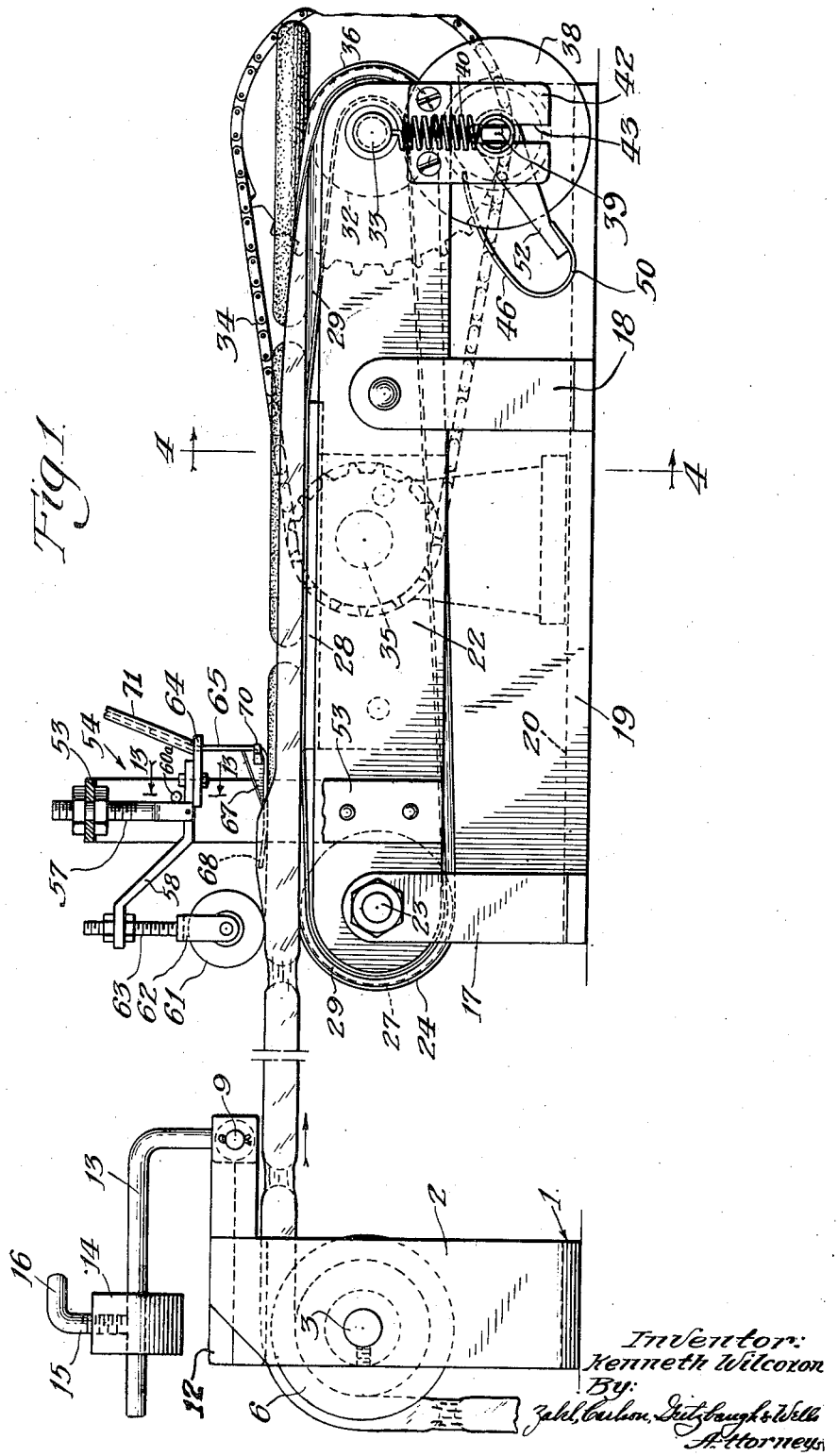

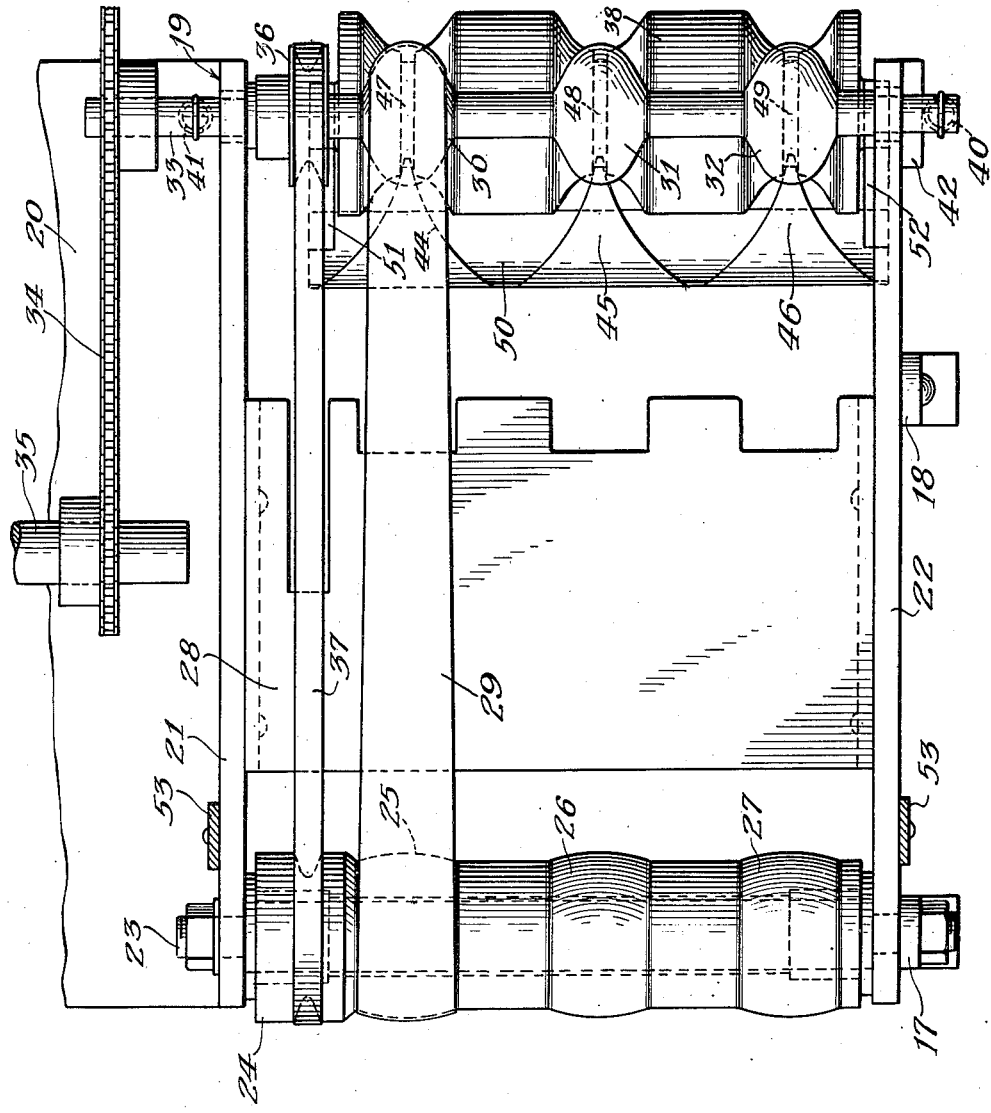
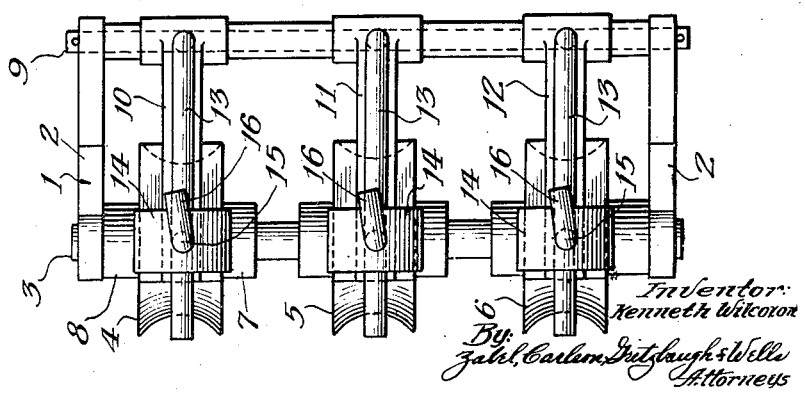

Inventor:
Kenneth Wilcoxon
By Zabel, Carlson, Gutzlaugh & Wells
Attorneys

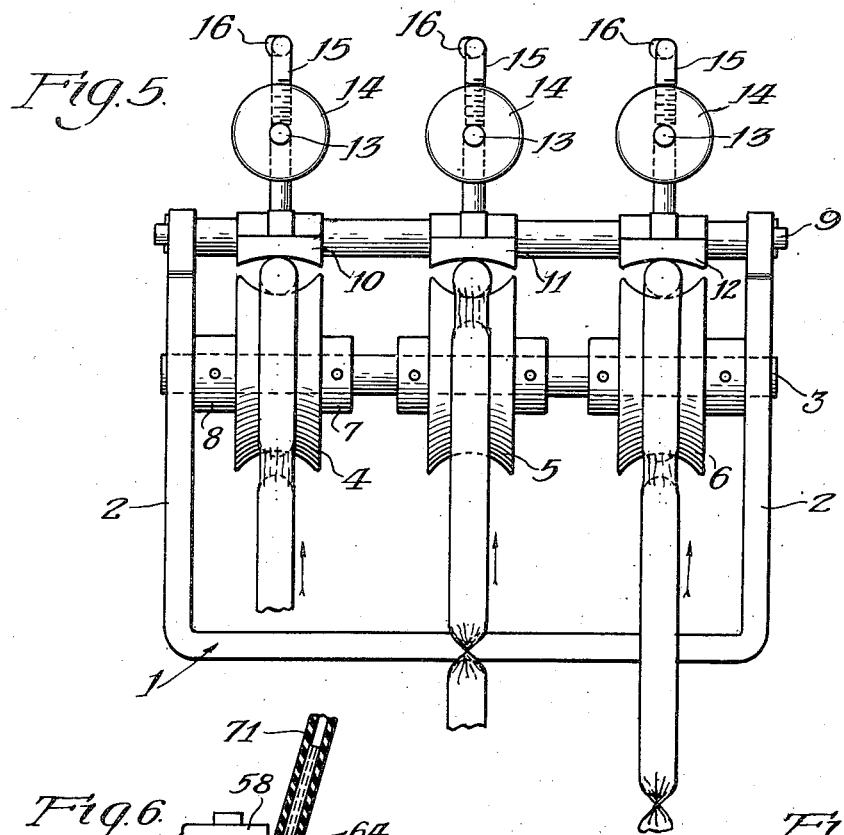
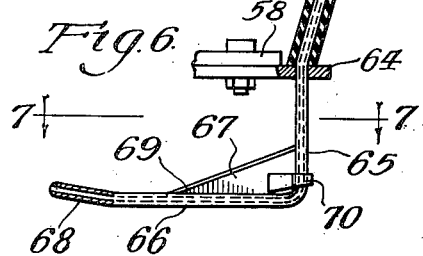
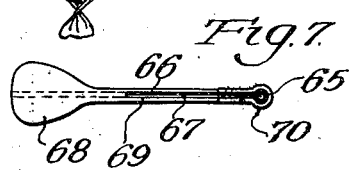
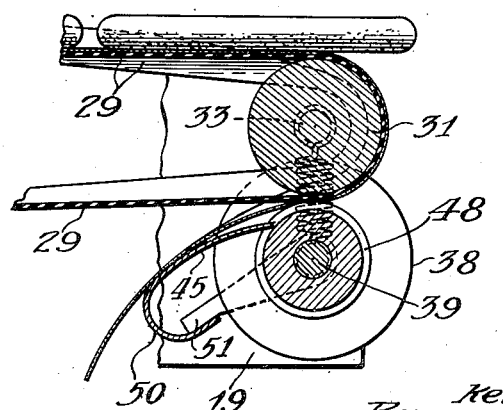
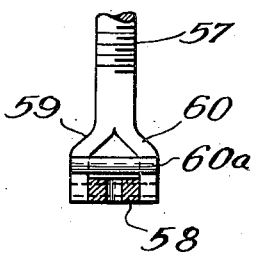
Inventor:
Kenneth Wilcoxon

July 22, 1947.  K. WILCOXON  2,424,346
STRIPPING CASINGS FROM SAUSAGES
Filed April 5, 1940  6 Sheets-Sheet 5

Inventor
Kenneth Wilcoxon
By
Zabel, Carlson, Fitzhugh & Wells
Attorneys

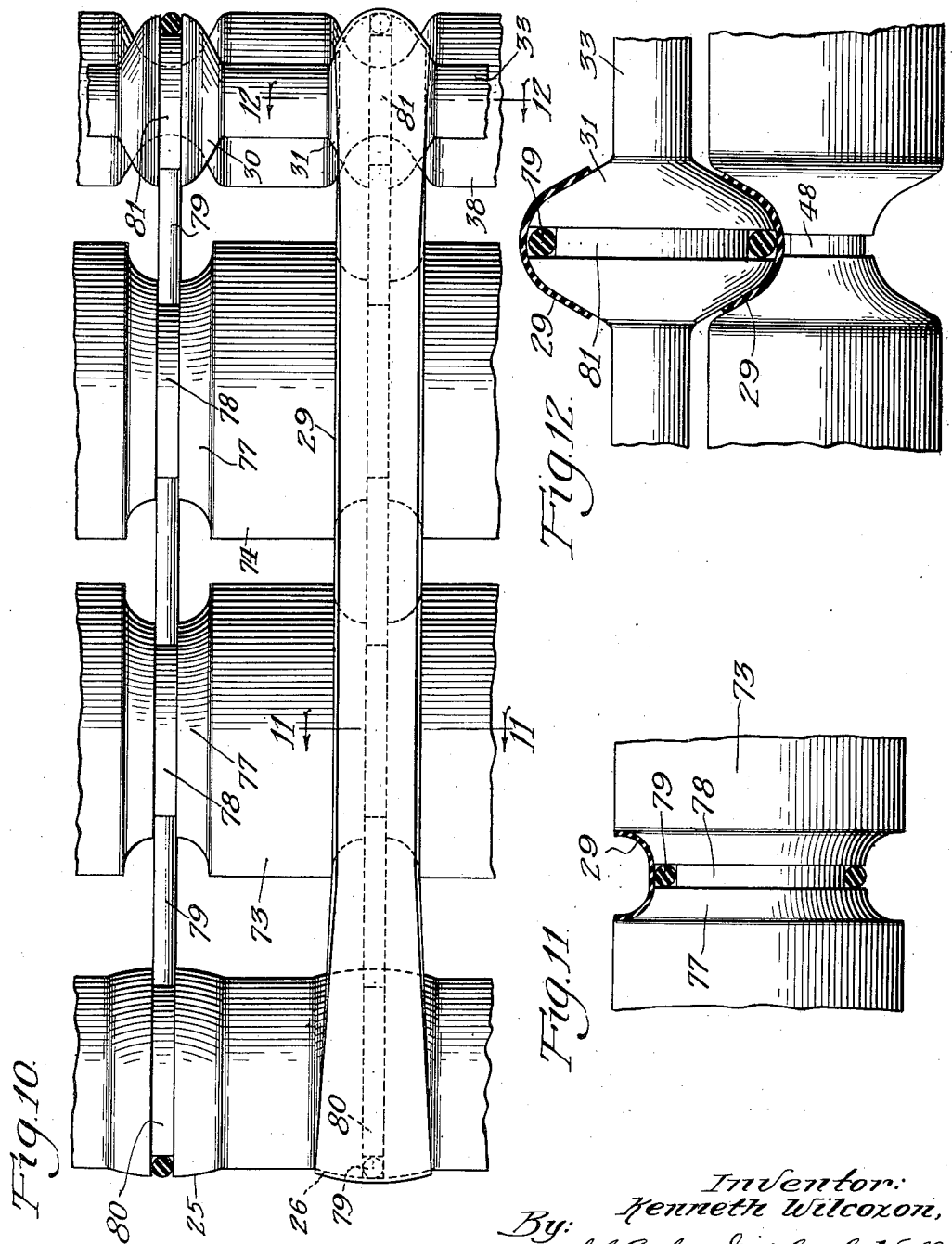

UNITED STATES PATENT OFFICE 2,424,346

STRIPPING CASINGS FROM SAUSAGES

Kenneth Wilcoxon, Chicago, Ill., assignor to The Visking Corporation, Chicago, Ill., a corporation of Virginia Application April 5, 1940, Serial No. 328,039

24 Claims. (Cl. 17—1)

The present invention relates to the manufacture of a so-called skinless frankfurter. In the manufacture, the material from which the frankfurters are formed is first stuffed in a casing of any suitable material such, for example, as the usual cellulose casing. These casings, as now manufactured, may be obtained in standard lengths of, for example, thirty-two feet. The frankfurter manufacturer stuffs the entire length of casing with the meat and then separates the meat into frankfurter lengths by twisting the casing or by some other means. The several links or units formed in this fashion are left secured together during the processing, that is, the cooking and smoking or other treatment necessary to prepare the product for the market.

The processing of the frankfurters in the casing of foreign material develops a natural skin which is made up of the dried material in the frankfurter itself. This material comes in contact with the inner casing wall and hardens sufficiently to provide a natural skin that will protect the frankfurter in the retail distribution thereof. The retailer is thus able to sell the frankfurter to the ultimate consumer without the objectionable skin thereon.

Heretofore, insofar as I am aware, it has been the general custom to remove the foreign casings from the frankfurters by hand. Each frankfurter is taken in the hand of the operator and a slit is started in the foreign casing by means of a knife, after which the foreign casing can be peeled off. The casing material, such as cellulose, will normally tear readily once it has been started by the knife cut. This hand method, however, is slow and expensive, and the sanitary aspects thereof are objectionable. It is the purpose of the present invention to provide a method and means whereby the foreign casing can be rapidly removed without damage to the natural skin which forms the protection for the product. The present invention contemplates leading a knife to the casing by means of an air blast which opens up the space between the casing and the natural skin. The air blast is applied in such fashion as to also insure the maintenance of the cutting part of the knife in spaced relation to the natural skin on the product, and thereby avoid any break in this natural skin protection.

The present invention contemplates also a novel method and means for peeling the cut foreign casing away from the frankfurter in such a fashion as to avoid the necessity of handling the frankfurter or the casing.

The novel features and advantages of the invention will appear more fully as the description proceeds, reference being had to the accompanying drawings wherein a preferred form of the invention is shown. It is to be understood, however, that the drawings and description are illustrative only, and are not to be taken as limiting the invention except insofar as it is limited by the claims.

In the drawings,

Fig. 1 is a view in side elevation of a machine which is adapted to carry out the method of the present invention;

Fig. 2 is a plan view of the device shown in Fig. 1;

Fig. 5 is an end view looking at the left-hand end of Fig. 2 with parts of the mechanism left out for the sake of clearness;

Fig. 6 is a fragmentary side view, partly in section, of the knife and air blast mechanism;

Fig. 7 is a sectional view taken on the line 7—7 of Fig. 6;

Fig. 8 is a fragmentary sectional view on the line 8—8 of Fig. 4;

Fig. 10 is a fragmentary plan view of a part of the mechanism shown in Fig. 9;

Fig. 11 is a sectional view taken on the line 11—11 of Fig. 10;

Fig. 12 is a sectional view taken on the line 12—12 of Fig. 10; and

Fig. 13 is an enlarged fragmentary sectional view taken on the line 13—13 of Fig. 1, with certain parts left out for clearness.

Figure 3:
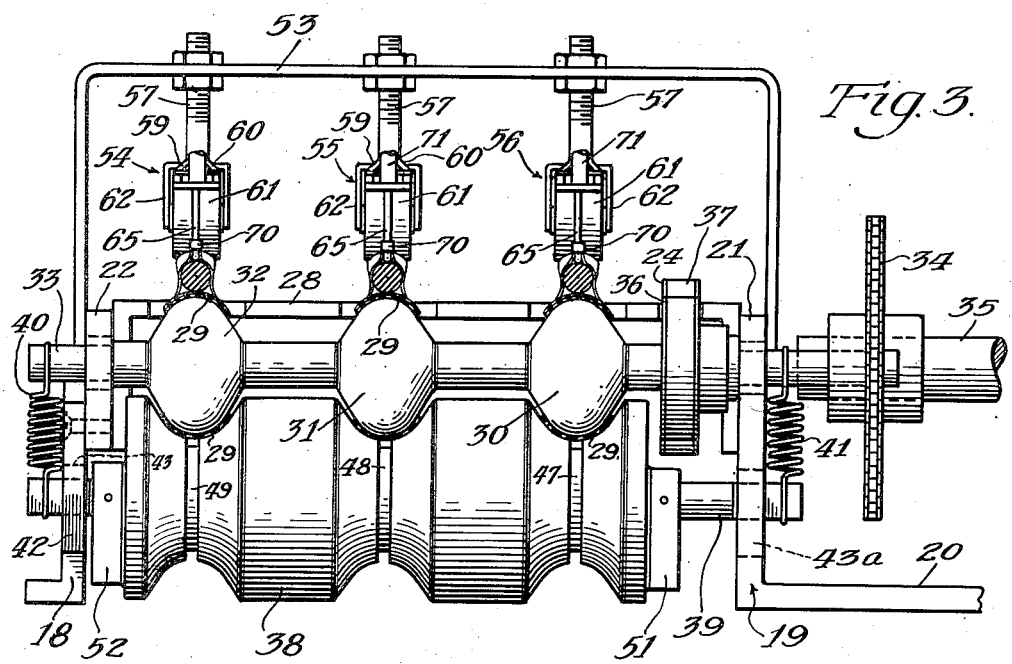
Fig. 3 is an end view looking at the right-hand end of Fig. 1 with certain parts of the mechanism shown in section.
Figure 4:
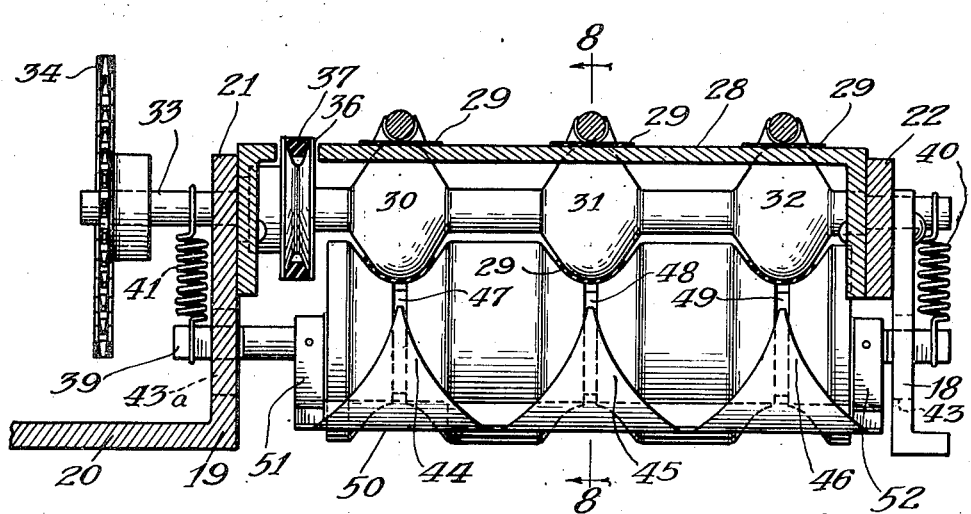
Fig. 4 is a sectional view taken on the line 4—4 of Fig. 1.
Figure 9:
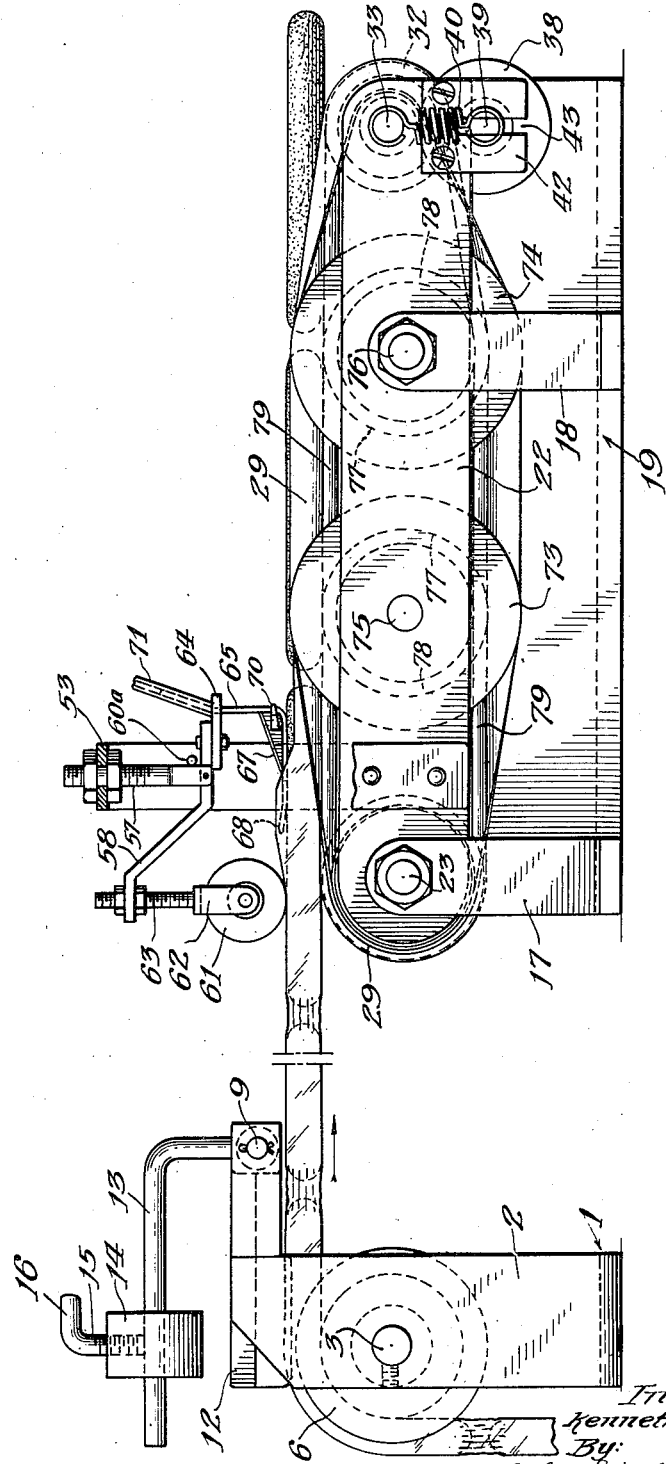
Fig. 9 is a view similar to Fig. 1, but illustrating a modified form of the invention.

Referring now to the drawings, the present invention contemplates a machine wherein a starting roll is provided over which a string of frankfurters is directed toward the device that opens up and slits the foreign casing. In the handling of frankfurters that have been formed by twisting the casing, it is desirable that the string of frankfurters move vertically upward to the starting roll in order that the twist in the casing may have an opportunity to work itself out before the string passes over the roll.

The starting roll mechanism is shown in Fig. 5 and at the left-hand ends of Figs. 1 and 2 and comprises a frame 1 having upright standards 2 which support a shaft 3. The shaft 3 is journalled in the standards 2 and carries a plurality of starting rollers 4, 5 and 6. These rollers are secured in place by suitable collars 7 and 8 so as to maintain the proper spaced relation.

The standards 2 also carry a supporting bar 9. The bar 9 forms a pivot for a plurality of brake shoe arms 10, 11 and 12. These brake shoe arms are adapted to ride over the rollers 4, 5 and 6 so as to furnish a retarding force tending to oppose the passage of the string of frankfurters from the rollers 4, 5 and 6. Each of the brake shoe arms has associated therewith a weight supporting rod 13 on which there is placed an adjustable weight 14. The weight 14 is held in adjusted position by a set screw 15 having a handle 16. It will be readily apparent that by adjusting the weight 14 along the rod 13 the pressure of the brake shoes 10, 11 and 12 upon the frankfurters may be varied at the will of the operator.

The string of frankfurters is led from the starting rollers 4, 5 and 6 to the slitting mechanism across an open space which will further enable the frankfurters to untwist. It is desirable to have a certain amount of tension applied to the frankfurters at this point in order to aid in straightening the casing between the frankfurters. The slitting mechanism, as shown best in Figs. 1, 2 and 6-8 inclusive, is adapted to carry the string of frankfurters along until the foreign casing is slit and the stripping thereof begins to take place.

A framework carries the slitting and stripping mechanism. This framework comprises spaced standards 17 and 18 at one side of the machine, as shown in Figs. 1 and 2, and an angular plate 19 at the other side of the machine. The plate 19 has a horizontal part 20 which serves as a motor support and a vertical portion 21 forming a side bar of the framework. Another side bar 22 connects the standards 17 and 18. The bars 21 and 22 mount a shaft 23 upon which a plurality of pulleys 24, 25, 26 and 27 are supported. The pulley 24 is a drive pulley, and all of the pulleys are connected together so as to rotate as a unit. The side bars 21 and 22 also support a platform 28 intermediate the ends of the side bars, which platform serves as a guide over which a plurality of belts 29 run. The belts 29 are trained over a plurality of convex pulleys 30, 31 and 32, these pulleys being carried by a shaft 33 which is journalled in the side bars 21 and 22. The shaft 33 and the several pulleys 24-27 and 30, 31 and 32 are driven by means of a chain drive 34 from a suitable motor driven power shaft 35. A pulley 36 on the shaft 33 drives a belt 37 which, in turn, drives the pulley 24.

The machine also has means for guiding the belts 29 and casings carried thereby beneath the pulleys 30, 31 and 32. This guide means comprises a roller 38 (see Fig. 3) which is mounted on a shaft 39. The shaft 39 is suspended by two springs 40 and 41 from the shaft 33 so as to be yieldingly pressed upward into engagement with the pulleys 30, 31 and 32. The side bar 22 carries a depending guide 42 which guide is slotted, as indicated at 43 in Fig. 1. The bar 21 is also slotted at 43a to cooperate with the guide 42 and maintain vertical alignment of the shaft 39 with the shaft 33. The shaft 39 has its ends flattened to fit in the slots 43 and 43a.

In order to prevent stripped casings which are fed around beneath the pulleys 31 and 32 from wrapping on the roller 38, I provide a plurality of strippers 44, 45 and 46. These strippers extend into grooves 47, 48 and 49 of the roller 38 in order to guide the casings away from the roller. It will be observed that the roller 38 is hollowed out to conform substantially to the contour of the convex pulleys 30, 31 and 32. The strippers 44, 45 and 46 are formed on a sheet metal piece 50 which is secured at its opposite ends by two arms 51 and 52. These arms are keyed on the shaft 39.

Referring now to Figs. 1, 3, 6, 7 and 13, it will be noted that the side bars 21 and 22 carry a U-shaped frame 53 which extends between the side frames and above them. This frame 53 supports a plurality of slitting units 54, 55 and 56. Each slitting unit comprises a vertically adjustable supporting stem 57 which is carried by the frame 53. A bar 58 is pivoted in the supporting stem 57 between two depending arms 59 and 60 thereof. A pin 60a fastened, by welding or otherwise, to the arms 59 and 60 limits the swinging movement of the bar 58 in one direction. One end of the bar 58 supports a roller 61 that is adapted to ride upon the string of frankfurters as it passes over one of the pulleys 25, 26 or 27. It is understood, of course, that there are three such rollers 61 in the size of device illustrated. However, the number of slitting units and rollers will be varied, depending upon the capacity of machine desired. The roller 61 is carried by a yoke 62 which, in turn, is adjustably mounted by means of a stem 63 on the bar 58.

The bar 58, near its other end, carries a bracket 64 which supports an L-shaped air tube 65. The air tube 65, as shown best in Fig. 6, has a horizontal portion 66 on which a slitting knife 67 is fastened. The tube 65 has a flattened end portion 68 projecting forwardly and slightly upwardly at the free end of the horizontal portion 66. The top of the horizontal portion 66 is preferably grooved slightly at 69 to receive the triangular shaped knife 67. The knife is fixed in place by means of a clip 70 which is mounted on the vertical portion of the tube 65. Air is supplied to the tube 65 by means of a flexible hose 71 from any suitable source of air pressure.

Referring now to Figs. 9-12 inclusive, in this form of the invention the structure is substantially the same, with the exception that, instead of utilizing the platform 28, I provide two rollers 73 and 74 between the shafts 23 and 33. These two rollers are carried on a pair of shafts 75 and 76 which shafts are journalled in the side bars 21 and 22. The rollers 73 and 74 are provided with spaced grooves 77 in which the belts 29 may operate. At the bottom of the grooves 77 a narrow groove 78 is provided in each roller, and a driving belt 79, which may be of round rubber, rides in the grooves 78. This driving belt is guided in a groove 80 of each pulley on the shaft 23 and is guided in a similar groove 81 of each pulley on the shaft 33. The relative diameter of the pulleys and of the intermediate rollers 73 and 74 is, of course, such that the belts 79 will maintain a uniform speed of the belts 29 over the pulleys on the shaft 23 through the grooves 77 and over the pulleys on the shaft 33. The construction shown in Figs. 9-12 inclusive operates substantially in the same fashion as that shown in the preferred form of the invention.

Referring now to the preferred form of the invention, and particularly to Fig. 1, the method by which the foreign casings are stripped from the frankfurters will be described. Initially, a string of frankfurters will be started over the starting roller 4, 5 or 6 and fed from this roller across the space between the standards 1 and 2 and the standards 17 and 18. When the front end of the string approaches the roller 61 it will be started beneath this roller and the flattened tip or nozzle 68 of the tube 65 will be inserted beneath the foreign casing. The end of the foreign casing is usually tied and this tie will have to be cut and opened up to start the string. When the nozzle 68 is inserted, the air pressure from the nozzle will blow in between the casing and the frankfurter and thus lift the casing away from the meat.

The casing is pulled forward by means of the belt 29 and the hand of the operator until it is cut by the knife 67. It is necessary to continue to guide the casing and frankfurter by hand until the slit casing can be started down around one of the convex pulleys 30, 31 or 32. Once the casing is passed around the convex pulley and caught between it and the roller 38, the string of frankfurters will be drawn forwardly to the knife 67 and the nozzle 68 by means of the belt 29 and the foreign casing. The pull of the convex pulley will cause the foreign casing to gradually spread away from the frankfurter and finally discharge the frankfurter without any damage to the natural skin thereon.

Owing to the fact that considerable pull is exerted lengthwise of the string, the foreign casing material between adjacent frankfurters will be straightened out to some exent and it will be inflated by the air from the nozzle 68 so as to pass freely over the knife 67. The twists, if they do not come out before the frankfurters pass over the starting rollers, can be taken out while the frankfurters are passing from the starting rollers to the slitting mechanism. It is possible thus to strip the foreign casing from an entire string of frankfurters without touching any of them after the machine is started. The length of the spring is immaterial. In fact, the longer the string, the better it is for the machine, because of the loss of time encountered in starting a string through the machine.

It may be necessary to adjust the weight 14 in order to obtain the right amount of drag or tension on the frankfurter casing. Also, it is possible to adjust the height of the roller 61 and the height of the nozzle 68 to take care of different sizes of frankfurters, as will be readily apparent from the drawings.

From the foregoing description it is believed that the nature and advantages of the present invention will be readily apparent to those skilled in the art. It will be evident that by providing a blast of fluid such as air in advance of the slitting knife, I am able to loosen the foreign casing from the natural skin of the frankfurter without damage to the skin. Thereafter it is a simple matter to pull the frankfurter over the knife and slit the casing without breaking the frankfurter skin.

Having thus described my invention, what I claim as new and desire to secure by Letters Patent is:

1. The method of removing foreign casings from sausages such as frankfurters which comprises separating the foreign casing from the sausage itself by means of a fluid blast, and cutting the separated casing by following the fluid blast with a knife.

2. The method of removing foreign casings from sausages such as frankfurters which comprises inserting a nozzle between the casing and the meat of the sausage so as to direct fluid longitudinally of the sausage, directing a fluid such as air through the nozzle along the sausage, and following the nozzle with a knife positioned longitudinally to cut the foreign casing.

3. The method of stripping foreign casings from the natural skin of a frankfurter or similar sausage which comprises drawing the foreign casing across a slitting knife while maintaining the natural skin intact and then by applying tension to the foreign casing causing it to gradually assume an inverted shape to thereby discharge the sausage with the natural skin intact.

4. The method of removing foreign casings from sausages such as frankfurters which comprises separating the foreign casing from the natural skin of the sausage by means of an air blast followed with a nozzle, slitting the separated casing, and then by applying tension to the casing causing it to gradually assume an inverted shape to thereby discharge the sausage with the natural skin intact.

5. The method of removing foreign casings from sausages such as frankfurters which comprises directing a fluid jet between the casing and sausages at one end to separate the casing from the sausage and moving the sausage longitudinally in contact with a cutter for slitting the casing lengthwise at one side.

6. The method of removing foreign casings from sausages such as frankfurters which comprises directing a fluid jet between the casing and sausage at one end to separate the casing from the sausage, splitting the casing while so separated and thereafter pulling the casing transversely for stripping the casing from the sausage.

7. The method of removing foreign casings from sausages such as frankfurters which comprises directing a fluid jet between the casing and sausage at one end to separate the casing from the sausage, splitting the casing while so separated and thereafter inverting the split casing to remove the sausage.

8. Means for stripping casings from sausages comprising a nozzle through which is directed a fluid stream, a cutter spaced away from the end of said nozzle, and means for moving the sausages whereby the latter are successively acted upon by the first named elements.

9. Means for stripping casings from sausages comprising a nozzle through which is directed a fluid stream, a cutter spaced away from the end of said nozzle, and roller means for moving the sausages whereby the latter are successively acted upon by the first named elements.

10. Means for stripping casings from sausages comprising a nozzle through which is directed a fluid stream, a cutter spaced away from the end of said nozzle, a series of horizontally spaced rollers disposed away from said nozzle and cutter, and means for rotating said rollers whereby sausages supported thereon may be conveyed in operative relationship with said nozzle and cutter.

11. Means for stripping casings from sausages, said means comprising a sausage carrying movable belt, a nozzle insertable under the sausage casings, means to direct a blast of fluid to said nozzle and a casing cutter spaced from said nozzle.

12. Means for stripping casings from sausages, said means comprising a sausage carrying movable belt, a nozzle insertable under the sausage casings, means to direct a blast of fluid to said nozzle, a casing cutter spaced from said nozzle and means for stripping the cut casings from said sausages.

13. Means for stripping casings from sausages, said means comprising a sausage carrying movable belt, a nozzle insertable under the sausage casings, means to direct a blast of fluid to said nozzle, a casing cutter spaced from said nozzle and means for stripping the cut casings from said sausages, said means comprising a convex pulley around which pass said casings.

14. Means for stripping casings from sausages, said means comprising a sausage carrying movable belt, a nozzle insertable under the sausage casings, means to direct a blast of fluid to said nozzle, a casing cutter spaced from said nozzle and means for stripping the cut casings from said sausages, said means comprising a convex pulley and a yielding cooperating concave pulley, between which pass said casings.

15. Means for stripping casings from sausages, said means comprising a sausage carrying movable belt, braking means for opposing the forward motion of the sausages, a nozzle insertable under the sausage casing, means to direct a blast of fluid to said nozzle, a casing cutter spaced from said nozzle and means for stripping the cut casings from said sausages.

16. Means for stripping casings from sausages, said means comprising a sausage carrying movable belt, braking means for opposing the forward motion of the sausages, a nozzle insertable under the sausage casing, means to direct a blast of fluid to said nozzle, a casing cutter spaced from said nozzle and means for stripping the cut casings from said sausages, said means comprising a convex pulley around which pass said casings.

17. Means for stripping casings from sausages, said means comprising a sausage carrying movable belt, braking means for opposing the forward motion of the sausages, a nozzle insertable under the sausage casing, means to direct a blast of fluid to said nozzle, a casing cutter spaced from said nozzle and means for stripping the cut casings from said sausages, said means comprising a convex pulley and a yielding cooperating concave pulley, between which pass said casings.

18. Means for stripping casings from sausages, said means comprising a sausage carrying movable belt, a nozzle insertable under the sausage casing, means to direct a blast of fluid to said nozzle, a casing cutter spaced from said nozzle, and means gripping the cut casings which strip said casings from the sausages and also pull said casings whereby the sausages are moved to cooperate with said nozzle and cutter.

19. Means for stripping casings from sausages, said casing having twists therein between the sausage links, said means comprising means for pulling a string of sausages, a portion of said string being under tension whereby the casing tends to untwist, a nozzle insertable under the untwisted casing, means to direct a blast of fluid to said nozzle and a casing cutter spaced from said nozzle.

20. Means for stripping casings from sausages, said casing having twists therein between the sausage links, said means comprising means for pulling a string of sausages, a portion of said string being under tension whereby the casing tends to untwist, a nozzle insertable under the untwisted casing, means to direct a blast of fluid to said nozzle, a casing cutter spaced from said nozzle and means for stripping the cut casings from said sausages.

21. Means for stripping casings from sausages, said casing having twists therein between the sausage links, said means comprising means for pulling a string of sausages, a portion of said string being under tension whereby the casing tends to untwist, a nozzle insertable under the untwisted casing, means to direct a blast of fluid to said nozzle, a casing cutter spaced from said nozzle and means for stripping the cut casings from said sausages, said means comprising a convex pulley around which pass said casings.

22. Means for stripping casings from sausages, said casing having twists therein between the sausage links, said means comprising means for pulling a string of sausages, a portion of said string being under tension whereby the casing tends to untwist, a nozzle insertable under the untwisted casing, means to direct a blast of fluid to said nozzle, a casing cutter spaced from said nozzle and means for stripping the cut casings from said sausages, said means comprising a convex pulley and a yielding cooperating concave pulley, between which pass said casings.

23. In a machine of the kind described, means for feeding a stuffed casing through the machine, a leader extending between the casing and the stuffing, means for slitting the casing separated from the stuffing by the leader, and means for peeling the slit casing from the stuffing.

24. In a machine of the kind described, means for feeding a stuffed casing through the machine, a leader extending between the casing and the stuffing, means for slitting the casing separated from the stuffing by the leader, and means for peeling the slit casing from the stuffing, said leader being hollow and affording an air nozzle through which air under pressure is discharged into the casing to build up a pressure therein prior to the slitting of the casing.

KENNETH WILCOXON.

REFERENCES CITED

The following references are of record in the file of this patent:

UNITED STATES PATENTS

| Number | Name | Date |
|---|---|---|
| 1,484,618 | Blades | Feb. 26, 1924 |
| 1,764,425 | Thomas | June 17, 1930 |
| 1,822,375 | Ryder | Sept. 8, 1931 |

FOREIGN PATENTS

| Number | Country | Date |
|---|---|---|
| 301,032 | Great Britain | Jan. 30, 1930 |